(12) United States Patent
Tsai et al.

(10) Patent No.: US 11,892,707 B2
(45) Date of Patent: Feb. 6, 2024

(54) IMAGING LENS ASSEMBLY AND OPTICAL VERIFICATION SYSTEM

(71) Applicant: NEWMAX TECHNOLOGY CO., LTD., Taichung (TW)

(72) Inventors: Tsung-Chi Tsai, Taichung (TW); Sheng-An Wang, Taichung (TW)

(73) Assignee: NEWMAX TECHNOLOGY CO., LTD., Taichung (TW)

(*) Notice: Subject to any disclaimer, the term of this patent is extended or adjusted under 35 U.S.C. 154(b) by 467 days.

(21) Appl. No.: 17/352,542

(22) Filed: Jun. 21, 2021

(65) Prior Publication Data

US 2022/0229269 A1     Jul. 21, 2022

(30) Foreign Application Priority Data

Jan. 19, 2021   (TW) ................. 110101952

(51) Int. Cl.
  *G02B 9/12*    (2006.01)
  *G02B 5/20*    (2006.01)
  *G02B 7/20*    (2021.01)

(52) U.S. Cl.
  CPC ............. *G02B 9/12* (2013.01); *G02B 5/20* (2013.01); *G02B 7/20* (2013.01)

(58) Field of Classification Search
  CPC .. G02B 27/0172; G02B 27/281; G02B 30/36; G02B 2027/0185; G02F 1/29; G02F 2203/07; G02F 2203/50
  USPC ........................................................ 359/279
  See application file for complete search history.

(56) References Cited

U.S. PATENT DOCUMENTS

2009/0244725 A1* 10/2009 Huang .................. G02B 7/022
                                                      359/796

* cited by examiner

*Primary Examiner* — Wyatt A Stoffa
*Assistant Examiner* — Mitchell T Oestreich
(74) *Attorney, Agent, or Firm* — Juan Carlos A. Marquez; Marquez IP Law Office, PLLC

(57) ABSTRACT

An imaging lens assembly of an optical verification system with a FOV greater than 120 degrees, and includes optical lenses from an object side to an image side. The one of the optical lens being the closest to the object side includes: an object side surface and an image side surface of an optical zone; an object side surface of a non-optical-zone surrounding the object side surface of the optical zone; an image side surface of a non-optical zone surrounding the image side surface of the optical zone; and a first connection portion disposed between the image side surface of the optical-zone and the image side surface of the non-optical zone, wherein a first angle between a tangential direction of a surface of the first connection portion and the radial direction is in a range of 15 to 50 degrees.

20 Claims, 8 Drawing Sheets

IMAGING LENS ASSEMBLY AND OPTICAL VERIFICATION SYSTEM

CROSS-REFERENCE TO RELATED APPLICATION

This application claims the benefit of Taiwan Patent Application No. 110101952, filed on Jan. 19, 2021, which is hereby incorporated by reference for all purposes as if fully set forth herein.

BACKGROUND

Technical Field

The present disclosure relates to an imaging lens assembly, and more specifically, to a structure of an imaging lens assembly of an optical verification system that eliminates stray light.

Related Art

A biometrics that uses unique biometric characteristics of each creature as basis is usually used in existing mobile devices that are commercially available currently due to the uniqueness, the universality, the permanence, the measurability, the convenience, the acceptance, the non-deception, and the like of the biometric system, and is even used in many electronic devices for application, such as fingerprint verification, vein verification, face verification, palmprint verification, iris recognition, and retinal scan, etc.

An optical verification lens is a conventional biometrics that uses the principle of optical imaging. The problem that needs to resolve currently is not only the excessively large size of the conventional biometrics, but also the need to improve the image resolution and image quality.

Generally, an optical lens assembly made of plastic material is used in an optical verification device to effectively reduce the manufacturing costs of the optical lens assembly. The conventional optical lens assembly made of plastic material is usually formed by means of injection molding, and has a smooth and bright surface and features of a high reflectivity. Therefore, when stray light is reflected from a surface of another optical lens of the optical lens assembly to a surface of the optical lens made of plastic material, the stray light reflected from the surface of the plastic optical lens cannot be effectively attenuated and will be incident into a surface of the image sensing element in an imaging lens module.

FIG. 1 is a schematic diagram of a structure of an optical verification system with a three-piece lens assembly. Description is provided by using an optical verification system 9 with a three-piece lens assembly as an example. The structure of the optical verification system 9 includes a cover plate 91, a first optical lens 921, a light shading element 924, a second optical lens 922, and a third optical lens 923 that are sequentially arranged along an optical axis I from an object side to an image side. Light first passes through the cover plate 91, the first optical lens 921, the light shading element 924, the second optical lens 922, and the third optical lens 923, and then passes through a light filter 925, to reach an image sensing element 93. In this way, the image sensing element 93 receives imaging light beams from an object.

The first optical lens 921 has an object side surface 9211 of a non-optical zone, an image side surface 9213 of the non-optical zone, an object side surface 9212 of the optical zone surrounded by the object side surface 9211 of the non-optical zone and enabling imaging light to pass through, and an object side surface 9214 of the optical zone surrounded by the image side surface 9213 of the non-optical zone and enabling the imaging light to pass through. The second optical lens 922 has an object side surface 9221 of the non-optical zone, an image side surface 9223 of the non-optical zone, an object side surface 9222 of the optical zone surrounded by the object side surface 9221 of the non-optical zone and enabling imaging light to pass through, and an object side surface 9224 of the optical zone surrounded by the image side surface 9223 of the non-optical zone and enabling the imaging light to pass through. The third optical lens 923 has an object side surface 9231 of the non-optical zone, an image side surface 9233 of the non-optical zone, an object side surface 9232 of the optical zone surrounded by the object side surface 9231 of the non-optical zone and enabling imaging light to pass through, and an object side surface 9234 of the optical zone surrounded by the image side surface 9233 of the non-optical zone and enabling the imaging light to pass through. The light shading element 924 is mounted at a position between the image side surface 9213 of the non-optical zone of the first optical lens 921 and the object side surface 9221 of the non-optical zone of the second optical lens 922.

However, as shown in FIG. 2, light is between the cover plate 91 and the first optical lens 912, and some of the light is further reflected due to the image side surface 9213 of the non-optical zone after passing through the cover plate 91 and the first optical lens 921. In particular, light paths of stray light enter the image sensing element sequentially along arrow directions L1, L2, and L3. Consequently, ghost images are generated, and the verification ability of the optical verification system is reduced.

Therefore, how to meet the requirement of eliminating stray light between the cover plate and the optical lenses has become one of the important subjects, to improve the image quality and increase the verification ability, and meet the requirement of a top-end verification lens module.

SUMMARY

The objective of the present disclosure is to provide a design of a connection portion between an image side surface of the optical zone and an image side surface of the non-optical zone, to prevent stray light from causing unnecessary ghost images during imaging, to further improve the image quality, thereby increasing the verification ability of an optical verification system.

To achieve the above objective, the present disclosure provides an imaging lens assembly with a field of view (FOV) greater than 120 degrees, and defined with a radial direction and an axial direction perpendicular to each other. The imaging lens assembly comprises a plurality of optical lenses from an object side to an image side, each of the optical lenses comprising an optical zone and a non-optical zone, and the one of the optical lens being the closest to the object side comprises: an object side surface of the optical zone and an image side surface of the optical zone; an object side surface of the non-optical-zone surrounding the object side surface of the optical zone; an image side surface of the non-optical zone surrounding the image side surface of the optical zone; and a first connection portion disposed between the image side surface of the optical-zone and the image side surface of the non-optical zone; wherein a first angle between a tangential direction of a surface of the first connection portion and the radial direction is in a range of 15 to 50 degrees.

The present disclosure further provides an optical verification system, from an object side to an image side, sequentially comprising: a cover plate; the above-mentioned imaging lens assembly; and an image sensing element.

According to the optical verification system of the present disclosure, the connection portion is designed to disposed between the image side surface of the optical zone and the image side surface of the non-optical zone of the optical lens, and the connection portion eliminates stray light between the cover plate and the optical lens by using, for example, a inclined surface, an arc angle, a convex surface, or a plurality of inclined surfaces, to prevent the stray light from causing unnecessary ghost images during imaging, to further improve the image quality, thereby increasing the verification ability of the optical verification system.

DETAILED DESCRIPTION

Figure 1:
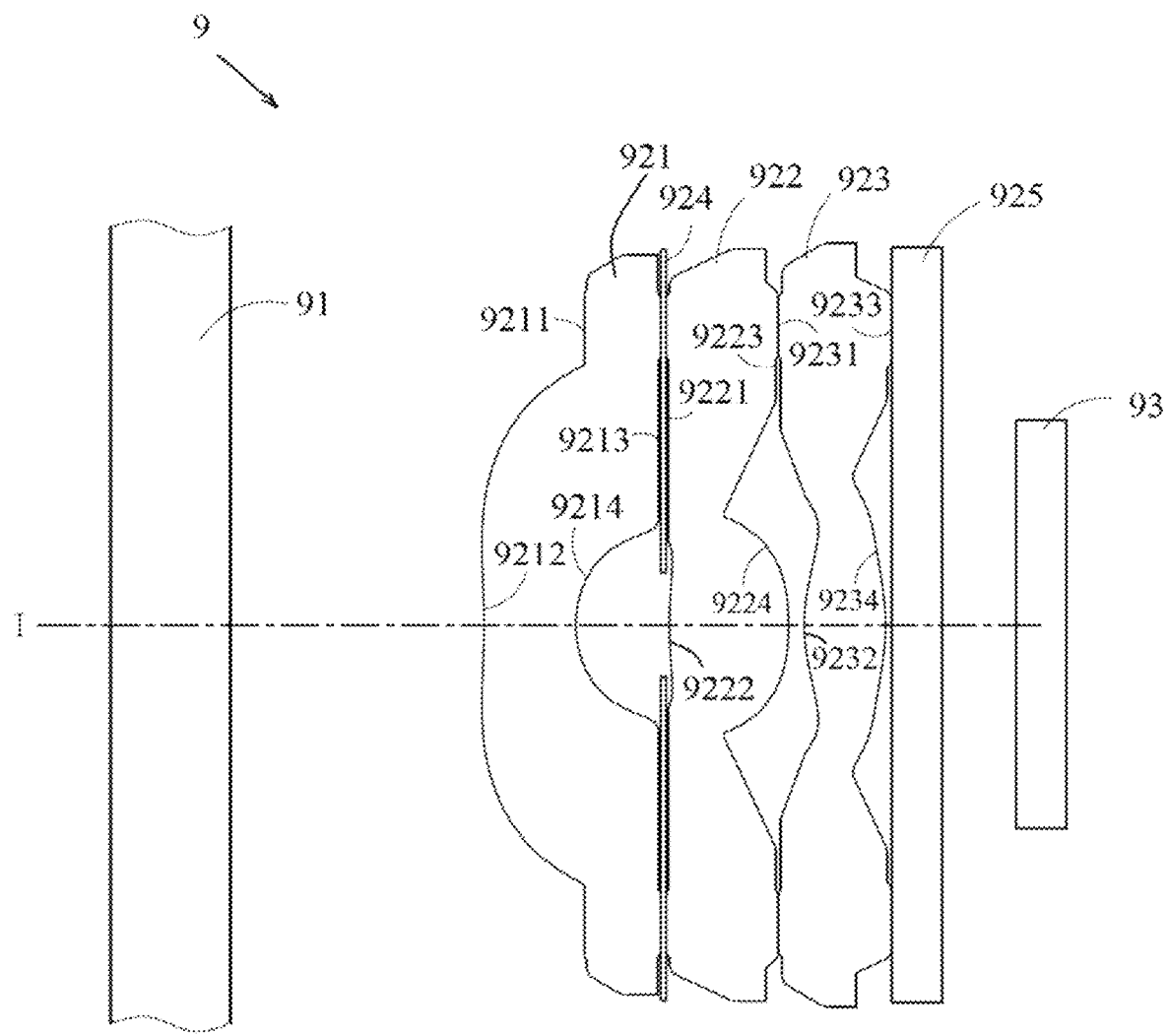
FIG. 1 is a schematic diagram of a structure of an optical verification system with a three-piece lens assemble in the prior art.
Figure 2:
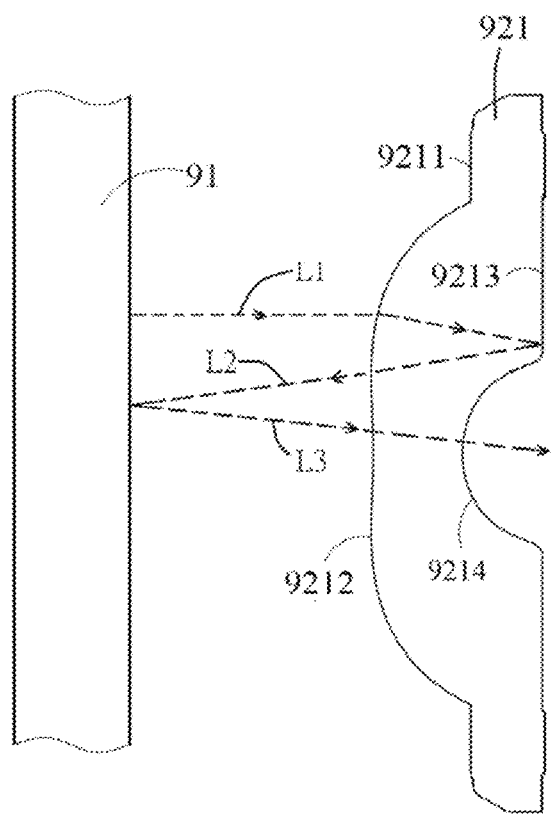
FIG. 2 is a schematic diagram of light reflection between a cover plate and an optical lens shown in FIG. 1.

To make persons skilled in the art understand the solutions in the present disclosure better, the following describes the technical solutions in the embodiments of the present disclosure with reference to the accompanying drawings in the embodiments of the present disclosure. Apparently, the described embodiments are merely some but not all of the embodiments of the present disclosure. However, for the description of the present disclosure, if it is determined that the detailed description makes the embodiments of the present disclosure unclear, the detailed description may be omitted. Parts not related to the description are omitted, to specifically describe the present disclosure, and throughout the specification, the same reference numerals refer to the same components.

In implementations, same or similar reference numerals are used to indicate same or similar components, and details may be omitted in the description. In addition, features in different exemplary embodiments may be combined with each other as long as no conflict occurs, and simple equivalent changes and modifications made in accordance with the specification or the claims still fall within the scope of this patent. In addition, terms such as "first" and "second" mentioned in the specification or the claims are only used to name discrete components or to distinguish between different embodiments or ranges, and are not intended to define the upper or lower limit of the quantity of components or the manufacturing order or setting order of components.

Figure 3A:
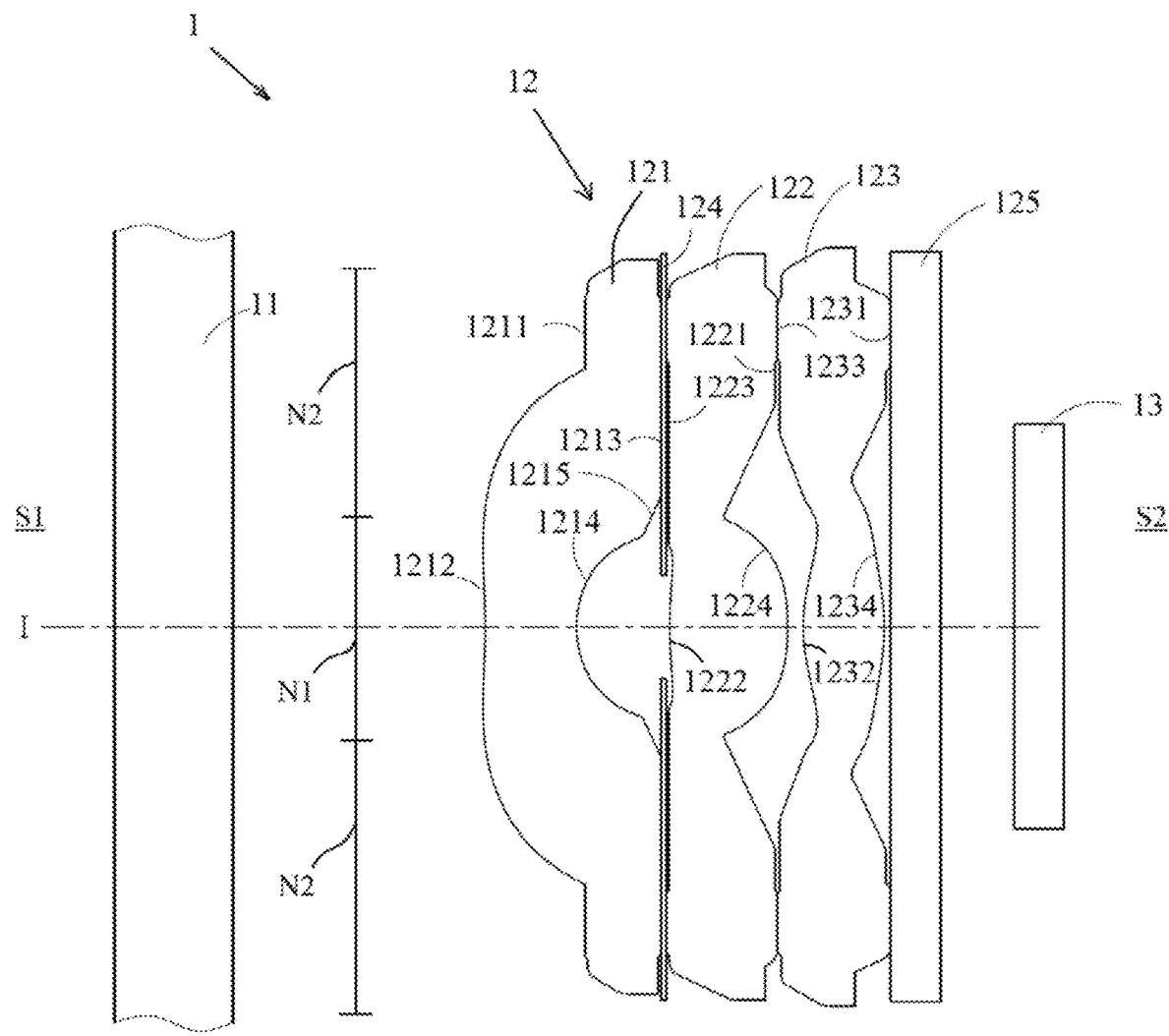
FIG. 3a is a schematic diagram of a structure of an optical verification system according to an embodiment of the present disclosure.
Figure 3B:
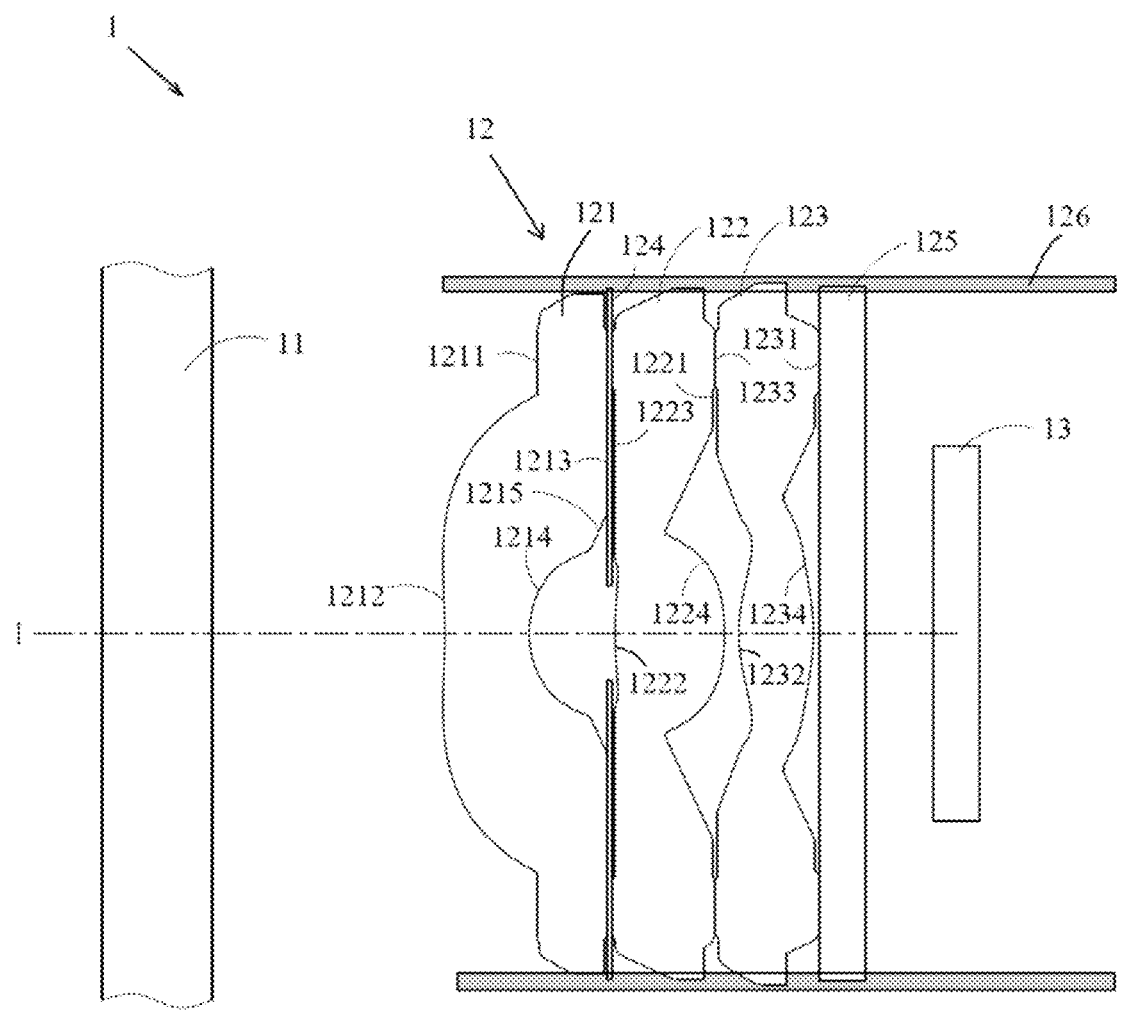
FIG. 3b is a schematic diagram of a structure of an optical verification system according to another embodiment of the present disclosure.

FIG. 3a is a schematic diagram of a structure of an optical verification system according to an embodiment of the present disclosure. The present disclosure relates to a structure of an imaging lens assembly of an optical verification system, and description is provided by using an optical verification system with a three-piece optical lens assembly as an example. The optical verification system 1 includes a cover plate 11, an imaging lens assembly 12, and an image sensing element 13 that are disposed along an optical axis I from an object side to an image side. The imaging lens assembly 12 of the present disclosure may be considered as an ultra-wide angle imaging lens module with a field of view (FOV), which can be greater than 120 degrees, 130 degrees, 140 degrees, 150 degrees, or the like. The imaging lens assembly 12 includes a first optical lens 121, a light shading element 124, a second optical lens 122, a third optical lens 123, and a light filter 125 (for example, an infrared filter, an infrared bandpass filter, or another optical band filter) that are sequentially disposed along the optical axis I from the object side S1 to the image side S2. Light passes through the first optical lens 121, the light shading element 124, the second optical lens 122, and the third optical lens 123, and passes through the light filter 125, to reach the image sensing element 13, so that the image sensing element 13 receives imaging light beams from an object. It is supplemented that, according to the application of the optical lenses in the embodiment, the quantity of the optical lenses is not limited. Referring to FIG. 3b, in another embodiment, the imaging lens assembly 12 further includes: a lens barrel 126, configured to accommodate a plurality of optical lenses (for example, the first optical lens 121, the light shading element 124, the second optical lens 122, and the third optical lens 123), and the light shading element. The light shading element 124 may be an aperture stop or a stop configured to correct edge light, but the present disclosure is not limited thereto.

Each of the first to third optical lenses 121, 122, 123 of the imaging lens assembly 12 includes an optical zone N1 and a non-optical zone N2. The first optical lens 121 includes: an object side surface 1211 of the non-optical zone N2, an object side surface 1212 of the optical zone N1 surrounded by the object side surface 1211 of the non-optical zone N2, an image side surface 1213 of the non-optical zone N2, and an image side surface 1214 of the optical zone N1 surrounded by the image side surface 1213 of the non-optical zone N2. The second optical lens 122 includes: an object side surface 1221 of the non-optical zone N2, an object side surface 1222 of the optical zone N1 surrounded by the object side surface 1221 of the non-optical zone N2, an image side surface 1223 of the non-optical zone N2, and an image side surface 1224 of the optical zone N1 surrounded by the image side surface 1223 of the non-optical zone N2. The third optical lens 123 includes: an object side surface 1231 of the non-optical zone N2, an object side surface 1232 of the optical zone N1 surrounded by the object side surface 1231 of the non-optical zone N2, an image side surface 1233 of the non-optical zone N2, and an image side surface 1234 of the optical zone N1 surrounded by the side surface 1233 of the non-optical zone N2.

The object side surfaces 1212, 1222, and 1232 of the optical zone N1 are lens surfaces facing toward the object side S1 (or an object) and enabling imaging light beams to pass through, and the image side surfaces 1214, 1224, and 1234 of the optical zone N1 are lens surfaces facing toward the image side S2 (or an imaging surface) and enabling the imaging light beams to pass through.

The cover plate 11 is configured to protect components located therebelow. According to the application of the cover plate in the embodiment, the cover plate 11 is a protective plate. During biometric verification, a surface of the cover plate 11 is in contact with the object. That is, the object is in contact with the surface of the cover plate 11, to perform biometric verification. The protective plate may include a transparent or semi-transparent body, to help imaging light beams to be transferred to the image sensing element 13. The source of the light beams may be external light, or light provided below the cover plate 11. The body of the protective plate may include a glass plate, a plastic plate, or a combination of the two, but the present disclosure is not limited thereto. In addition, the protective plate may selectively include a decorative layer, which is provided on the cover plate 11, to shield components that do not want to be seen therebelow.

According to the application of the cover plate in other embodiments, the cover plate 11 can further include a display panel, a touch panel, or a combination of at least the foregoing two. For example, the cover plate 11 can be a display panel, for example, an organic light emitting display panel, or a liquid crystal display panel, but the present disclosure is not limited thereto. Alternatively, the cover plate 11 can be a touch panel, for example, a panel having a plurality of touch electrodes. The plurality of touch electrodes can be formed on an outer surface of the panel or embedded in the panel, and the plurality of touch electrodes can perform touch detection by means of self-capacitance or mutual capacitance. Alternatively, the cover plate 11 can be a combination of a protective plate and a display panel or a combination of a protective plate and a touch panel.

The light shading element 124 can be disposed between the object and the imaging surface. For example, according to the optical verification system 1 in this embodiment of the present disclosure, the light shading element 124 is located on the image side surface 1213 of the non-optical zone N2 of the first optical lens 121. The first optical lens 121 is configured to enlarge the FOV for capturing images, so that the image sensing element 13 can capture a larger image range. In this embodiment, the first optical lens 121 has negative refractive power. In addition, a concave surface is formed at a position of the object side surface 1212 of the optical zone N1 of the first optical lens 121 close to the optical axis I, and a concave surface is formed at a position of the image side surface 1214 of the optical zone N1 of the first optical lens 121 close to the optical axis I. The first optical lens 121, the second optical lens 122, and the third optical lens 123 can be made of plastic materials, to meet the requirement of a light design, but the present disclosure is not limited thereto.

The light shading element 124 is configured to shield the stray light, to improve the image quality. In this embodiment, the light shading element 124 is disposed at a position between the image side surface 1213 of the non-optical zone N2 of the first optical lens 121 and the object side surface 1221 of the non-optical zone N2 of the second optical lens 122.

The second optical lens 122 is configured to correct an aberration generated by the first optical lens 121, and help reduce generation of spherical aberrations, to improve the imaging quality. In addition, a convex surface is formed at a position of the object side surface 1222 of the optical zone N2 of the second optical lens 122 close to the optical axis I, and a convex surface is formed at a position of the image side surface 1224 of the optical zone N2 of the second optical lens 122 close to the optical axis.

The third optical lens 123 is also configured to correct an aberration, and help reduce generation of spherical aberrations, to improve the imaging quality. In addition, according to the application of optical lenses in the embodiment, an aberration is jointly corrected by using a plurality of optical lenses (for example, the second optical lens 122 and the third optical lens 123), so that not only the aberration can be effectively corrected, but also the difficulty of manufacturing each optical lens for correcting the aberration can be reduced. In addition, a convex surface is formed at a position of the object side surface 1232 of the optical zone N2 of the third optical lens 123 close to the optical axis, and a convex surface is formed at a position of the image side surface 1234 of the optical zone N2 of the third optical lens 123 close to the optical axis.

The light filter 125 is configured to perform color separation and color filtering on light. The image sensing element 13 converts light to a digital signal of image data through the light filter 125. According to the application of the third optical lens in the embodiment, the image side surface 1234 of the optical zone of the third optical lens 123 can be coated with a filter material with a specific light wavelength to replace the foregoing light filter 125, but this is not limited to the third optical lens, and the filter material may also be coated on the first optical lens or the second optical lens.

Figure 4:
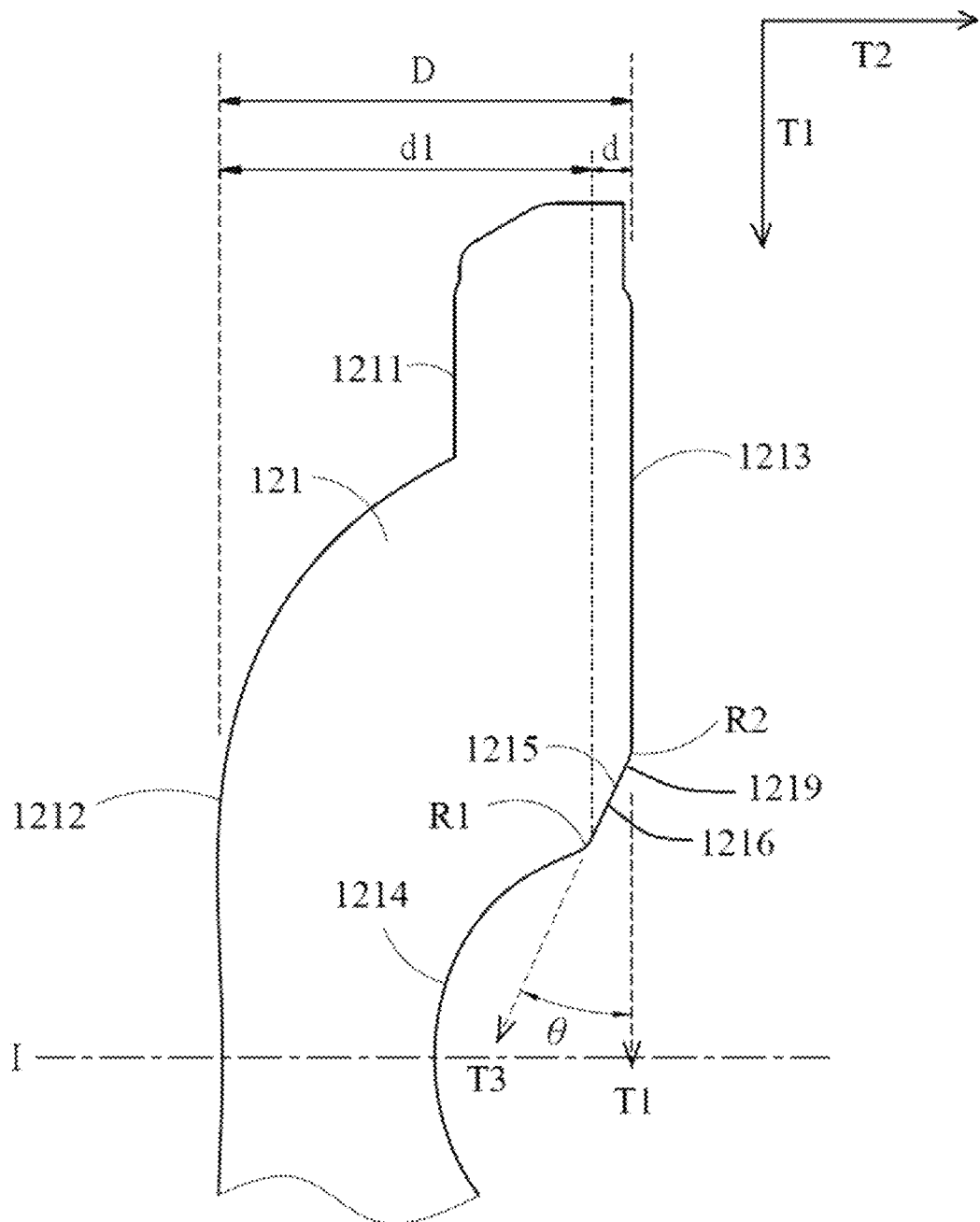
FIG. 4 is a schematic cross-sectional view of an optical lens according to a first embodiment of the present disclosure.

FIG. 4 is a schematic cross-sectional view of an optical lens according to a first embodiment of the present disclosure. Referring to FIG. 4 and FIG. 3, the optical lens of the present disclosure is described by using the first optical lens 121 as an example. The first optical lens 121 is the one of the optical lenses of the imaging lens assembly being the closest to the object side, and is defined with a radial direction T1 and an axial direction T2 that are perpendicular to each other. The axial direction T2 is parallel to the optical axis I. A concave surface is formed at a position of the image side surface 1214 of the optical zone of the first optical lens 121 close to the optical axis I. The first optical lens 121 further includes: a first connection portion 1215 disposed between the image side surface 1214 of the optical zone and the image side surface 1212 of the non-optical zone. For example, an oblique portion is formed between the image side surface 1213 of the non-optical zone and the image side surface 1214 of the optical zone of the first optical lens 121. A surface 1216 of the first connection portion 1215 is an inclined surface 1219 of the oblique portion. The inclined surface 1219 is circular around the axial direction T2 and surrounds the image side surface 1214 of the optical zone.

An angle θ between a tangential direction T3 (facing toward the optical axis I) of the surface 1216 of the first connection portion 1215 and the radial direction T1 (facing toward the optical axis I) can be in a range of 15 to 50 degrees, and preferably, the angle θ is in a range of 20 to 40 degrees. A first arc angle R1 is formed at a connection position between the first connection portion 1215 and the image side surface 1214 of the optical zone. A curvature radius of the first arc angle R1 can be in a range of 0.03 to 1.50 mm, and preferably, the curvature radius of the first arc angle R1 is in a range of 0.055 to 0.1 mm. A second arc angle R2 is formed at a connection position between the first connection portion 1215 and the image side surface 1213 of the non-optical zone. A curvature radius of the second arc angle R2 can be in a range of 0.03 to 0.15 mm, and preferably, the curvature radius of the second arc angle R2 is in a range of 0.055 to 0.1 mm.

According to the application of the first connection portion in the embodiment, a thickness d of the first connection portion 1215 along the axial direction T2 occupies 5% to 20% of a thickness D of the first optical lens 121 along the axial direction T2. That is, the thickness d of the oblique portion occupies 5% to 20% of the overall thickness D of the first optical lens 121. Preferably, the thickness d of the first connection portion 1215 along the axial direction T2 occupies 10% to 16% of the thickness D of the first optical lens 121 along the axial direction T2. For example, when a value of D is 0.7435 mm and a value of d is 0.1005 mm, a ratio of the value of d to the value of D is approximately 13.5%. Further, a distance dl between the object side surface 1212 of the optical zone of the first optical lens 121 and the connection position having the first arc angle R1 along the axial direction T2 is in a range of 0.4 to 1.0 mm.

Figure 5:
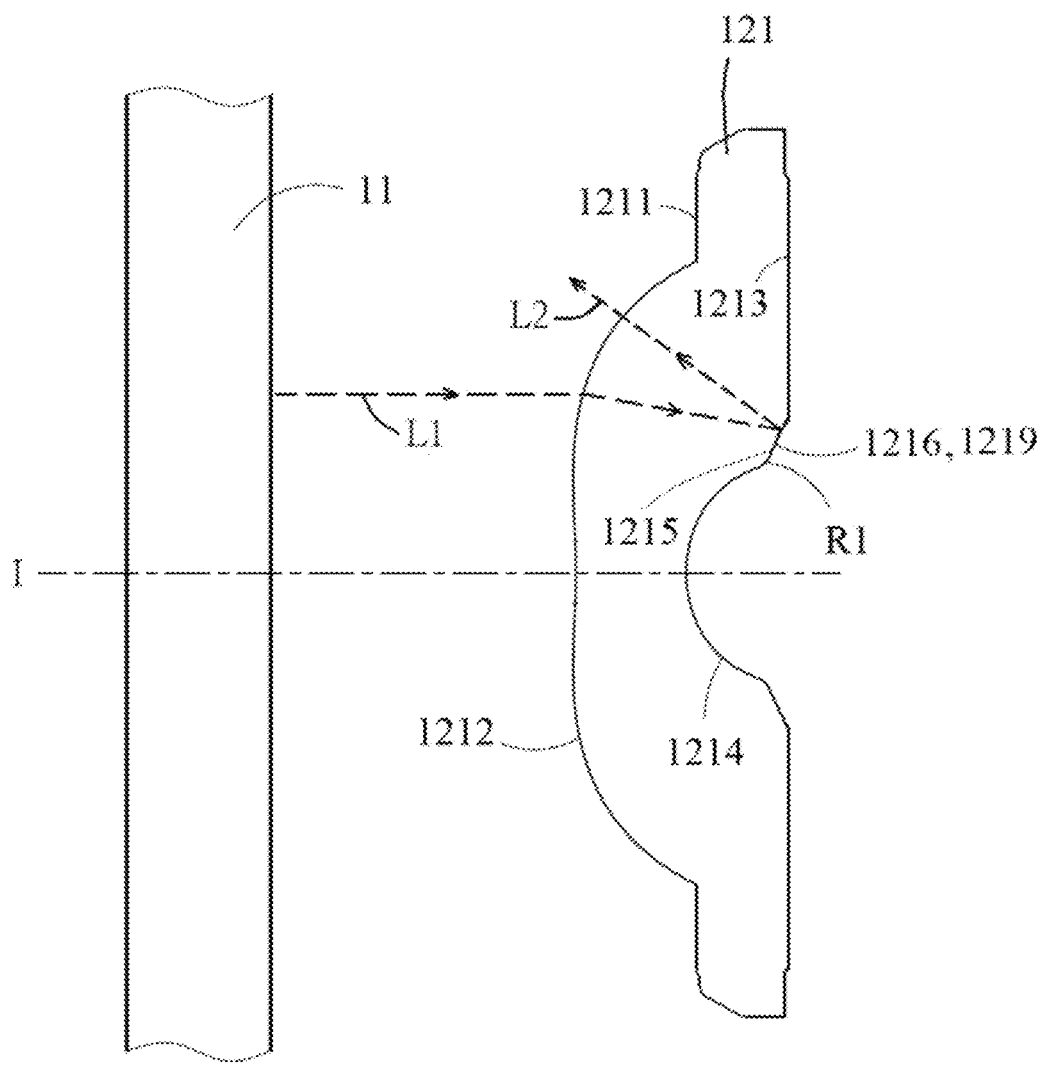
FIG. 5 is a schematic diagram of light reflection between a cover plate and an optical lens shown in FIG. 4 of the present disclosure.

Referring to FIG. 5 and FIG. 3*a*, according to the light located between the cover plate 11 and the first optical lens 121, and some of the light is further reflected due to the image side surface 1213 of the non-optical zone after passing through the cover plate 11 and the first optical lens 121. However, because the surface 1216 of the first connection portion 1215 between the image side surface 1213 of the non-optical zone and the image side surface 1214 of the optical zone is the inclined surface 1219, light paths of the stray light are sequentially reflected along the arrow directions L1 and L2 to leave the first optical lens 121. In this embodiment, light is reflected by using an inclined surface, so that the stray light cannot enter the image sensing element 13 through reflection for a plurality of times, thereby avoiding the generation of ghost images.

Figure 6:
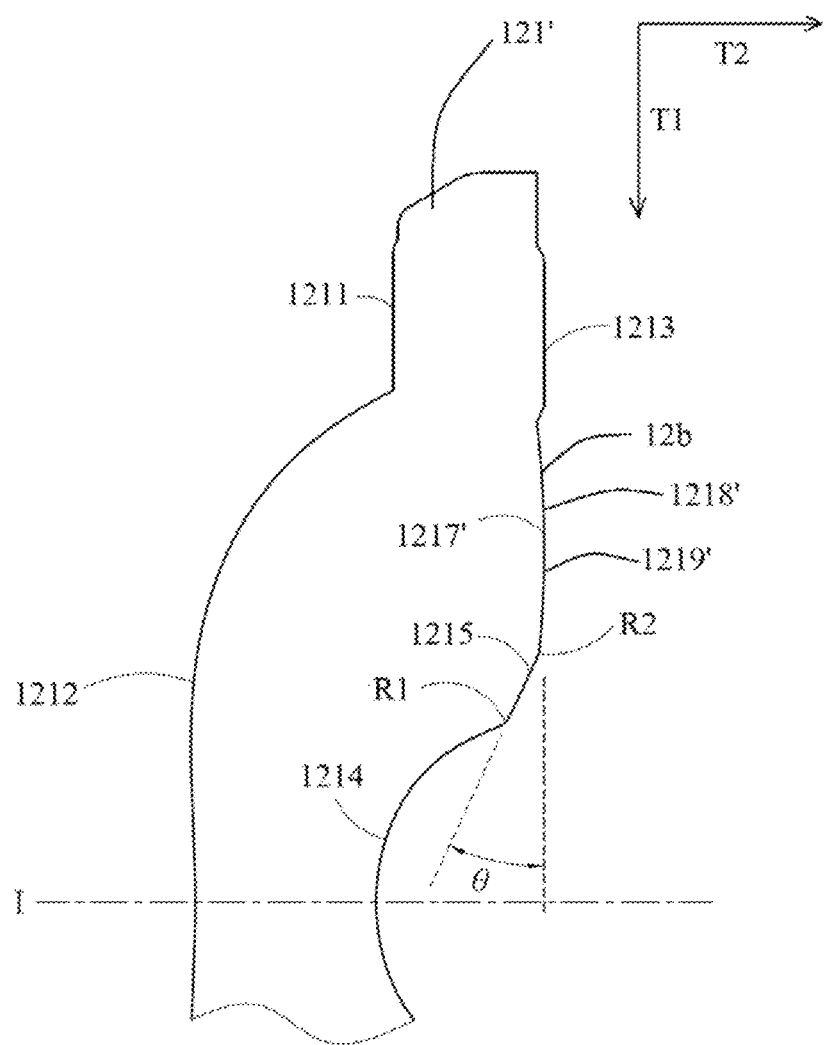
FIG. 6 is a schematic cross-sectional view of an optical lens according to a second embodiment of the present disclosure.

FIG. 6 is a schematic cross-sectional view of an optical lens according to a second embodiment of the present disclosure. Referring to FIG. 6 and FIG. 3*a*, a first optical lens 121' of the second embodiment is substantially similar to the first optical lens 121 of the first embodiment, and similar components are marked with similar reference numerals. The first optical lens 121' of the second embodiment differs from the first optical lens 121 of the first embodiment in that, the first optical lens 121' further includes a second connection portion 1217' located between the first connection portion 1215 and the image side surface 1213 of the non-optical zone. A surface 1218' of the second connection portion 1217' is a convex surface 1219', and the convex surface 1219' is circular around the axial direction T2 and surrounds the inclined surface 1215. The curvature radius of the convex surface 1219' of the second connection portion 1217' is in a range of 1.2 to 3.0 mm. According to the application of the first optical lens 121', light is reflected by using an inclined surface, so that stray light cannot pass through the light shading element 124 into the image sensing element 13 through reflection for many times, thereby avoiding the generation of ghost images. In addition, an arc-shaped convex surface (the surface 1218' of the second connection portion 1217') is formed by using a large curvature radius. Light is reflected by using the arc-shaped convex surface, so that the stray light cannot enter the image sensing element 13 through reflection for many times, thereby avoiding the generation of ghost images.

Figure 7:
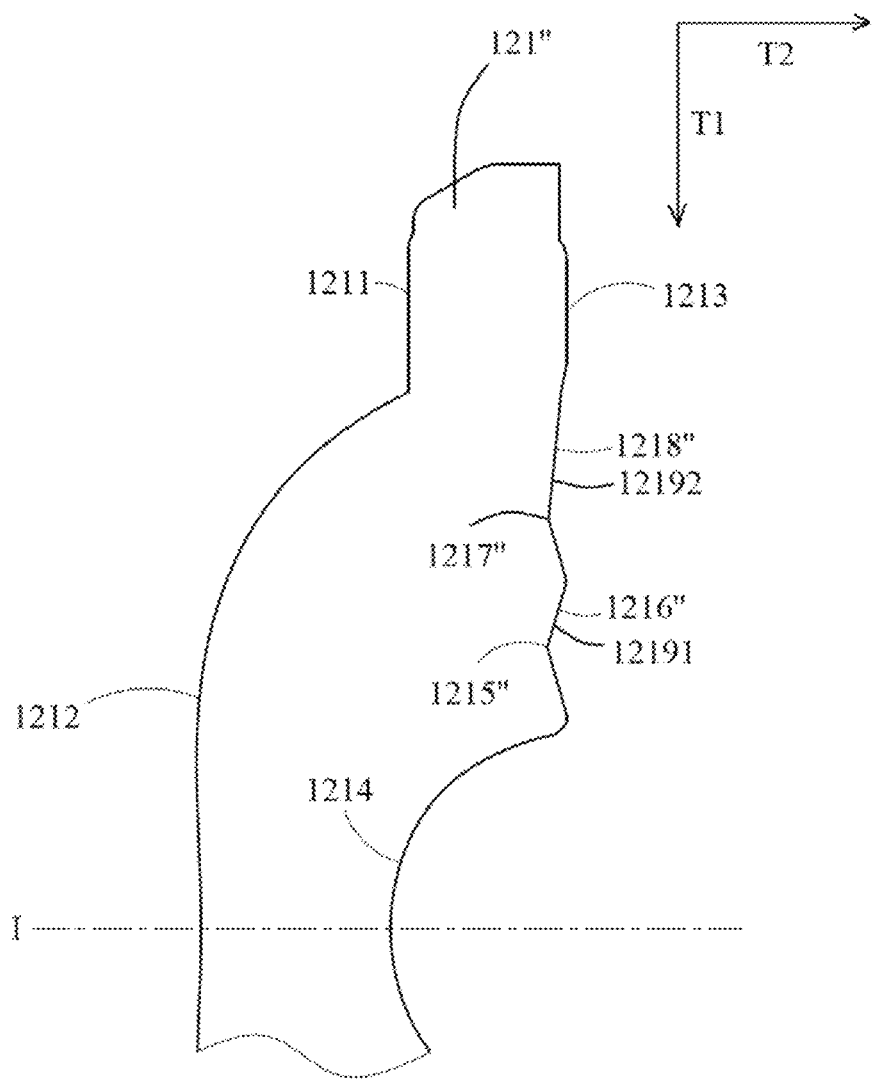
FIG. 7 is a schematic cross-sectional view of an optical lens according to a third embodiment of the present disclosure.

FIG. 7 is a schematic cross-sectional view of an optical lens according to a third embodiment of the present disclosure. Referring to FIG. 7 and FIG. 3, a first optical lens 121" of the third embodiment is substantially similar to the first optical lens 121 of the first embodiment, and similar components are marked with similar reference numerals. The first optical lens 121" of the third embodiment differs from the first optical lens 121 of the first embodiment in that, a concave surface is formed at a position of the image side surface 1214 of the optical zone close to the optical axis, and the first connection portion 1215" is a first groove (for example, a V-shaped groove), and the surface 1216" of the first connection portion 1215" is a first inclined surface 12191 of the first groove. The first inclined surface 12191 is circular around the axial direction T2 and surrounds the image side surface 1214 of the optical zone. The first optical lens 121" further includes a second connection portion 1217" located between the first connection portion 1215" and the image side surface 1213 of the non-optical zone. The second connection portion is a second groove (for example, a V-shaped groove), and a surface 1218" of the second connection portion 1217" is a second inclined surface 12192 of the second groove, and the second inclined surface 12192 is circular around the axial direction and surrounds the first inclined surface 12191. For example, the first connection portion 1215" and the second connection portion 1217" are two V-shaped grooves. A first angle between tangential direction of the first inclined surface 12191 (the surface 1216" of the first connection portion 1215") in the V-shaped grooves and the radial direction T2 is in a range of 15 to 50 degrees; and, a second angle between tangential direction of the second inclined surface 12192 (the surface 1218" of the second connection portion 1217") in the V-shaped grooves and the radial direction T2 is in a range of 15 to 50 degrees. The definition of the first and second angles is similar to the definition of the angle θ shown in FIG. 4. According to the application of the optical lens in the embodiment, light is reflected by using a wavy groove and an inclined surface, so that stray light cannot enter the image sensing element 13 through reflection for many times, thereby avoiding the generation of ghost images.

According to the optical verification system of the present disclosure, the connection portion is designed to disposed between the image side surface of the optical zone and the image side surface of the non-optical zone of the optical lens, and the connection portion eliminates stray light between the cover plate and the optical lens by using, for example, an inclined surface, an arc angle, a convex surface, or a plurality of inclined surfaces, to prevent the stray light from causing unnecessary ghost images during imaging, to further improve the image quality, thereby increasing the verification ability of the optical verification system.

The above descriptions are merely preferred embodiments of the present disclosure, and are not intended to limit the scope of the embodiments of the present disclosure, any simple equivalent replacement and modification according to the scope of the patent application of the present disclosure and descriptions of the disclosure shall fall within the protection scope of the present disclosure.

What is claimed is:

1. An imaging lens assembly with a field of view (FOV) greater than 120 degrees, defined with a radial direction and an axial direction perpendicular to each other, the imaging lens assembly comprising a plurality of optical lenses from an object side to an image side, each of the optical lenses comprising an optical zone and a non-optical zone, and the one of the optical lens being the closest to the object side comprising:

an object side surface of the optical zone and an image side surface of the optical zone;

an object side surface of the non-optical-zone surrounding the object side surface of the optical zone;

an image side surface of the non-optical zone surrounding the image side surface of the optical zone; and a first connection portion disposed between the image side surface of the optical-zone and the image side surface of the non-optical zone;

wherein a first angle between a tangential direction of a surface of the first connection portion and the radial direction is in a range of 15 to 50 degrees.

2. The imaging lens assembly according to claim 1, wherein the first angle is in a range of 25 to 40 degrees.

3. The imaging lens assembly according to claim 1, wherein the FOV is greater than 130 degrees.

4. The imaging lens assembly according to claim 1, wherein a first arc angle is formed at a connection position between the first connection portion and the image side surface of the optical zone, and a curvature radius of the first arc angle is in a range of 0.03 to 0.15 mm.

5. The imaging lens assembly according to claim 1, wherein a first arc angle is formed at a connection position between the first connection portion and the image side surface of the optical zone, and a curvature radius of the first arc angle is in a range of 0.055 to 0.1 mm.

6. The imaging lens assembly according to claim 1, wherein a thickness of the first connection portion along the axial direction occupies 5% to 20% of a thickness of the optical lens along the axial direction.

7. The imaging lens assembly according to claim 4, wherein there is a distance between the object side surface of the optical zone and the connection position having the first arc angle, and the distance along the axial direction is in a range of 0.4 mm to 1.0 mm.

8. The imaging lens assembly according to claim 1, wherein a second arc angle is formed at a connection position between the first connection portion and the image side surface of the non-optical zone, and a curvature radius of the second arc angle is in a range of 0.03 to 0.15 mm.

9. The imaging lens assembly according to claim 1, wherein the surface of the first connection portion is a first inclined surface, and the first inclined surface is circular around the axial direction and surrounds the image side surface of the optical zone.

10. The imaging lens assembly according to claim 9, further comprising:

a second connection portion disposed between the first connection portion and the image side surface of the non-optical zone, wherein a surface of the second connection portion is a convex surface, and the convex surface is circular around the axial direction and surrounds the first inclined surface.

11. The imaging lens assembly according to claim 10, wherein a curvature radius of the convex surface of the second connection portion is in a range of 1.2 to 3.0 mm.

12. The imaging lens assembly according to claim 9, further comprising:

a second connection portion disposed between the first connection portion and the image side surface of the non-optical zone, wherein a surface of the second connection portion is a second inclined surface, and the second inclined surface is circular around the axial direction and surrounds the first inclined surface.

13. The imaging lens assembly according to claim 12, wherein a second angle between a tangential direction of the surface of the second connection portion and the radial direction is in a range of 15 to 50 degrees.

14. An optical verification system, from an object side to an image side, sequentially comprising:

a cover plate;

an imaging lens assembly, being the imaging lens assembly according to claim 1; and an image sensing element.

15. The optical verification system according to claim 14, wherein the first angle is in a range of 25 to 40 degrees.

16. The optical verification system according to claim 14, wherein the FOV is greater than 130 degrees.

17. The optical verification system according to claim 14, wherein a first arc angle is formed at a connection position between the first connection portion and the image side surface of the optical zone, and a curvature radius of the first arc angle is in a range of 0.03 to 0.15 mm.

18. The optical verification system according to claim 14, wherein the surface of the first connection portion is a first inclined surface, and the first inclined surface is circular around the axial direction and surrounds the image side surface of the optical zone.

19. The optical verification system according to claim 18, further comprising:

a second connection portion disposed between the first connection portion and the image side surface of the non-optical zone, wherein a surface of the second connection portion is a convex surface, and the convex surface is circular around the axial direction and surrounds the first inclined surface.

20. The optical verification system according to claim 18, further comprising:

a second connection portion disposed between the first connection portion and the image side surface of the non-optical zone, wherein a surface of the second connection portion is a second inclined surface, and the second inclined surface is circular around the axial direction and surrounds the first inclined surface.

\* \* \* \* \*